United States Patent
Carlson et al.

(10) Patent No.: US 11,597,309 B2
(45) Date of Patent: *Mar. 7, 2023

(54) MATERIAL HANDLING SYSTEM FOR FACILITATING SELECTIVE MATERIAL MOVEMENT AND METHODS FOR EMPLOYING SUCH A SYSTEM

(71) Applicants: Nicholas Carlson, Crownsville, MD (US); Craig Carlson, Crownsville, MD (US)

(72) Inventors: Nicholas Carlson, Crownsville, MD (US); Craig Carlson, Crownsville, MD (US)

(*) Notice: Subject to any disclaimer, the term of this patent is extended or adjusted under 35 U.S.C. 154(b) by 11 days.

This patent is subject to a terminal disclaimer.

(21) Appl. No.: 16/903,287

(22) Filed: Jun. 16, 2020

(65) Prior Publication Data

US 2021/0387558 A1    Dec. 16, 2021

(51) Int. Cl.
  *B65G 35/04*    (2006.01)
  *B60P 1/38*    (2006.01)
  *B60P 7/02*    (2006.01)

(52) U.S. Cl.
  CPC .. *B60P 1/38* (2013.01); *B60P 7/02* (2013.01)

(58) Field of Classification Search
  CPC ..................................................... B65G 35/04
  See application file for complete search history.

(56) References Cited

U.S. PATENT DOCUMENTS

| | | | | |
|---|---|---|---|---|
| 2,747,476 A | * | 5/1956 | Manuel | B60P 1/38 296/51 |
| 2,876,917 A | * | 3/1959 | King | B60P 1/48 414/469 |
| 3,161,269 A | * | 12/1964 | Janssen | A01D 90/14 192/69.82 |
| 3,189,204 A | * | 6/1965 | Wiberg | A01D 90/105 414/502 |
| 3,443,703 A | * | 5/1969 | Matsumoto | B60P 1/006 414/539 |
| 3,520,434 A | * | 7/1970 | Benchoff | A01D 90/10 414/502 |
| 3,704,798 A | * | 12/1972 | Carpenture, Jr. | B60P 1/38 414/521 |

(Continued)

FOREIGN PATENT DOCUMENTS

EP    0624311 A1 * 11/1994 ........... A01D 90/105
KR    102366511 B1 * 2/2022

*Primary Examiner* — Joseph A Dillon, Jr.
(74) *Attorney, Agent, or Firm* — TannerIP PLLC; Daniel A. Tanner, III; James E. Golladay, II

(57) ABSTRACT

A system and method are provided for facilitating selective delivery of aggregate material in bulk from a back of a dump truck or other truck bed to one or more wheelbarrows in a controlled manner. The disclosed embodiments further provide a system that could be operated by a single individual, including the single individual that is then manually moving the wheelbarrow from the truck to the particular location of the delivery site where the aggregate material is to be finally dispensed. The disclosed systems provide a self-contained mechanical device that is comparatively-easily mountable to the back of a dump truck or other truck bed for use, and is electrically, or electric over hydraulically, powered through the electrical system of the vehicle in order to avoid any need for additional power requirements.

14 Claims, 6 Drawing Sheets

(56) References Cited

U.S. PATENT DOCUMENTS

| | | | | | |
|---|---|---|---|---|---|
| 3,790,090 | A | * | 2/1974 | Lorenc | B60P 1/38 |
| | | | | | 239/666 |
| 3,978,996 | A | * | 9/1976 | Oltrogge | B60P 1/38 |
| | | | | | 296/57.1 |
| 4,049,145 | A | * | 9/1977 | Downing | A01D 90/10 |
| | | | | | 414/502 |
| 4,277,220 | A | * | 7/1981 | Wiley | B60P 1/006 |
| | | | | | 414/539 |
| 4,842,471 | A | * | 6/1989 | Hodgetts | B65G 35/04 |
| | | | | | 414/521 |
| 4,892,456 | A | * | 1/1990 | Hodgetts | B65G 67/20 |
| | | | | | 410/92 |
| 5,156,518 | A | * | 10/1992 | VanMatre | B60P 1/38 |
| | | | | | 414/509 |
| 5,573,365 | A | * | 11/1996 | Michalski | B65G 35/04 |
| | | | | | 414/811 |
| 6,033,179 | A | * | 3/2000 | Abbott | B60P 1/00 |
| | | | | | 414/527 |
| 6,974,296 | B2 | * | 12/2005 | Simrin | B65G 69/08 |
| | | | | | 414/527 |
| 7,320,572 | B2 | * | 1/2008 | Smith | B60P 1/38 |
| | | | | | 414/813 |
| 8,813,882 | B2 | * | 8/2014 | Albright | B60P 1/38 |
| | | | | | 56/11.4 |
| 10,220,757 | B2 | * | 3/2019 | Jung | B65G 67/08 |
| 10,471,879 | B1 | * | 11/2019 | Copp | B60J 7/041 |
| 2010/0219275 | A1 | * | 9/2010 | Weiss | A01K 5/005 |
| | | | | | 241/101.76 |
| 2014/0286739 | A1 | * | 9/2014 | Helmsderfer | E01C 19/2045 |
| | | | | | 414/528 |
| 2015/0336142 | A1 | * | 11/2015 | Kozak | B09B 1/00 |
| | | | | | 83/13 |

* cited by examiner

MATERIAL HANDLING SYSTEM FOR FACILITATING SELECTIVE MATERIAL MOVEMENT AND METHODS FOR EMPLOYING SUCH A SYSTEM

This application is a Continuation of U.S. patent application Ser. No. 16/215,580, filed Dec. 10, 2018, which issued on Jun. 16, 2020 as U.S. Pat. No. 10,682,941 B2 to Carlson et al., which in turn is a Continuation of U.S. patent application Ser. No. 15/439,045, filed Feb. 22, 2017, which issued on Dec. 11, 2018 as U.S. Pat. No. 10,150,401 B2 to Carlson et al., which in turn claims the benefit of U.S. Provisional Patent Application No. 62/341,670, entitled "A Self-Contained Conveyor System Component For Facilitating Selective Unloading Of Truck Beds And Hoppers And Methods For Employing Such A System Component," filed May 26, 2016, the disclosures of which are hereby incorporated by reference herein in their entirety.

BACKGROUND

1. Field of the Disclosure

This disclosure is directed to exemplary embodiments of automated systems, methods, techniques, processes, products and product components that facilitate simplified hands free and selective dispensing of mulch, dirt, salt, sand and other aggregate material from a truck dump bed or other truck bed.

2. Description of the Related Art

Mulch, dirt, salt, sand or other shredded or particulate aggregate material ("aggregate material") is often used in landscaping. Transport of the aggregate material to a particular site is routinely undertaken by use of a dump truck or other truck. At a supply source, the dump truck or other truck is typically loaded using a front end loader to load the aggregate material into the truck bed. Otherwise, an overhead hopper with a dispenser component may be used to load the aggregate material into the truck bed. These simplified operations allow the truck to be quickly loaded at the supply end.

The aggregate material transport evolution takes on a number of different schemes, often using particularized equipment, at the delivery site for the aggregate material. In order to provide broad spectrum salt dispersal, for example, spreader attachments are often mounted to the back of the dump truck or other truck that spread salt or other chemical materials on road beds. In these instances, the salt is delivered or dispensed from the dump bed via a particularly-configured spreading apparatus that generally provides wide area broadcast spreading of the salt, often via a rotating broadcast spreader or other like wide-area delivery component.

In areas where the dump truck or other truck can gain direct access not only to a delivery site, but to a particular location at the delivery site where the aggregate load can be dumped in bulk, the unloading evolution is fairly simple. In these instances, the aggregate material is simply dumped in a pile to be otherwise moved around the delivery site using tractors, backhoes, other mechanical shovel implements, or manually by, for example, loading multiple wheelbarrows and moving the aggregate material to the particular location where the aggregate material is ultimately dispensed for use.

In areas where the dump truck or other truck cannot gain direct access to the delivery site and/or to the particular location at the delivery site where the aggregate load is to be used, the above-described manual loading evolution of multiple wheelbarrows for moving the aggregate material from the dump bed or truck bed to the particular location where the aggregate material is to be used becomes more tedious generally involving significant, and comparatively time-consuming, manual interaction.

Shoveling an aggregate material such as, for example, mulch from a back of a large dump truck, trailer, or other truck bed is a time-consuming and labor-intensive evolution. The evolution may involve a number of individuals including one or more "on the pile" in the truck bed shoveling the aggregate material from the truck bed into wheelbarrows as other individuals cycle the empty wheelbarrows to the back of the dump truck or other truck bed to be filled by the individuals in the truck bed. Full wheelbarrows are then carted away to transport the aggregate material to the particular location where it is to be used on the site. This evolution is actually more efficient than the even more cumbersome evolution in which one or more individuals undertake both (1) the shoveling of the material from the truck bed into wheelbarrows and (2) the transport of the material via the wheelbarrows to the particular location for use. At least, the former evolution has the advantage of attempting to more efficiently employ all of the individuals in the wheelbarrow filling and wheelbarrow cycling evolution to move the aggregate material from the truck bed to the final location for dispersal.

Numerous attempts have been made at fashioning hopper devices, similar to the salt-spreading broadcast spreader devices, to be mounted on the backs of dump trucks, or other truck beds in order to dump the aggregate material into the wheelbarrows from the dump bed or other truck bed. Previous attempts have attempted to configure material transport devices that take the form, for example, of hopper dispensing arrangements under which the wheelbarrows may be positioned to have the aggregate material directed from a hopper output into the wheelbarrows. Unfortunately, in most instances, these previous attempts have tended to be cumbersome, expensive, and comparatively difficult to operate. These devices often require separate power sources and tend to be very bulky and designed to a specific, inflexible aggregate delivery scenario.

SUMMARY OF EMBODIMENTS

It may be advantageous in view of the shortfalls in the currently available market to produce a material transport component that is usable to simply deliver aggregate material in bulk from a back of a dump truck or other truck bed to one or more wheelbarrows in a controlled and reasonably straightforward manner. It would be further advantageous to provide a system that could be operated by a single individual, including the single individual that is then manually moving the wheelbarrow from the truck to the particular location of the delivery site where the aggregate material is to be finally dispensed.

Exemplary embodiments of the systems and methods according to this disclosure may provide a self-contained mechanical device that is comparatively-easily mountable to the back of a dump truck or other truck bed.

Exemplary embodiments may provide a self-contained mechanical device that is configured to facilitate controlled delivery of an aggregate material from the dump bed or other truck bed to a waiting receptacle, including wheelbarrow or other wheeled cart, for further transport of the aggregate material from an unloading point to a point where the aggregate material is to be used at a particular location to which the truck does not have access.

Exemplary embodiments may provide a dispensing system that includes one or more motors that are electrically, or electric over hydraulically, powered through the electrical system of the vehicle in order to avoid any need for additional power requirements.

Exemplary embodiments may provide a particularly-arranged system of mechanical components for moving the aggregate material from the truck bed to an input of the externally-mounted device and then to provide for efficient and reasonably complete removal of the aggregate material from the truck bed via the system.

Exemplary embodiments may provide a particularly arranged horizontal transport system that may be in the form of a conveyor belt, or an auger-type arrangement, that may be operated by the push of a single button to facilitate the direction of the aggregate material from the truck bed to the waiting receptacles.

Exemplary embodiments may provide a mounting arrangement whereby the aggregate material delivery device may be mounted in a "hinged" arrangement to facilitate being swung from an engagement position spanning the backend of the truck bed to a position leaving the backend of the truck bed open to facilitate other operations including loading the truck bed with materials from a particular site to be removed and separately disposed about a remote.

Exemplary embodiments may provide a tarpaulin arrangement that is manipulable by the aggregate material delivery device to facilitate covering the aggregate material while in transport and to aid with removal of the aggregate material from the truck bed to the aggregate material delivery device is used These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating simplified automated hands free and selective dispensing of mulch, dirt, salt, sand and other aggregate material from a truck dump bed or other truck bed, will be described, in detail, with reference to the following drawings, in which.

DESCRIPTION OF EMBODIMENTS

The systems and methods for providing a conveyor apparatus for efficiently and selectively transferring aggregate materials from a dump bed or truck bed to one or more waiting receptacles to which the aggregate material may be directed according to this disclosure will generally refer to these specific utilities for the disclosed systems, methods, processes, techniques and/or schemes of movement. Exemplary embodiments described and depicted in this disclosure should not be interpreted, however, as being specifically limited to any particular configuration of a system of integrated electro-mechanical (or electro-hydraulic) components, including one or more motors, to accomplish the above function, any particular configuration of a dump truck bed, utility trailer, or other truck bed to which a system according to the disclosed embodiments may be mounted, or to any particular granular, particulate, pulverized, or other bulk aggregate material to be transported from the truck bed to the waiting receptacles according to the disclosed schemes. It should be recognized that any advantageous use of schemes for moving aggregate materials from dump beds or other truck beds to waiting receptacles that may employ devices and/or methods such as those presented in this disclosure is contemplated as being included within the scope of the disclosed exemplary systems and methods.

The disclosed systems and methods will be described as being particularly adaptable for use in the delivery, for example, of mulch to a landscaping site to which a truck may have limited access. This description, and the associated references, are intended to provide a particular real-world use case in which the disclosed systems and methods may be particularly beneficially adapted for use. These references are intended to be illustrative only and should not be considered as limiting the disclosed systems and methods to any particular embodiment, application, operational scenario or use case. Generic reference will be made to comparatively more efficient aggregate handling, and aggregate movement, at a delivery site to be illustrative of the advantages that may be achieved through full implementation of the disclosed schemes.

Figure 1A:
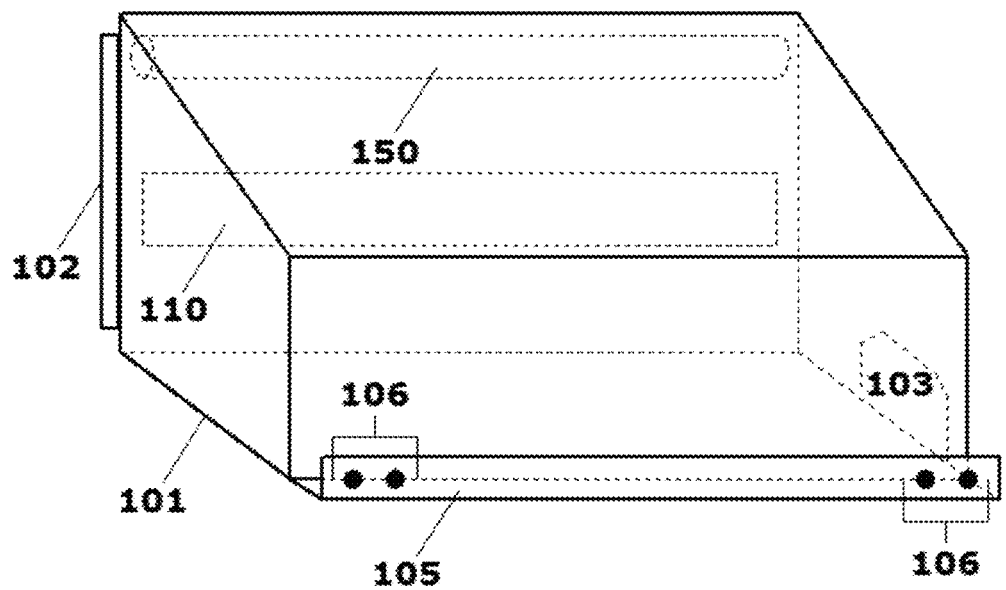
FIG. 1A illustrates a schematic diagram of a perspective view of a first exemplary embodiment of an aggregate material dispensing device according to this disclosure.
Figure 1B:
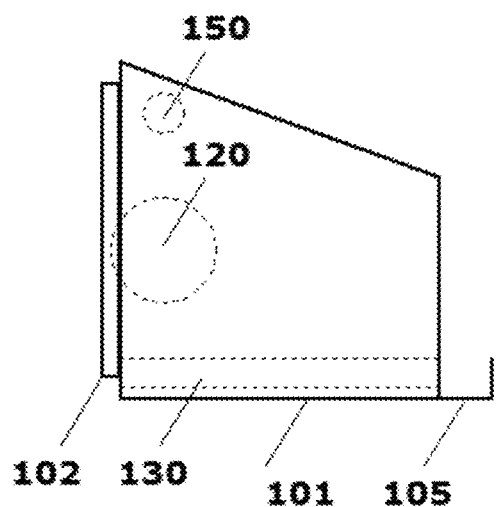
FIG. 1B illustrates a schematic diagram of a first (left) lateral side of the first exemplary embodiment of an aggregate material dispensing device according to this disclosure.
Figure 1C:
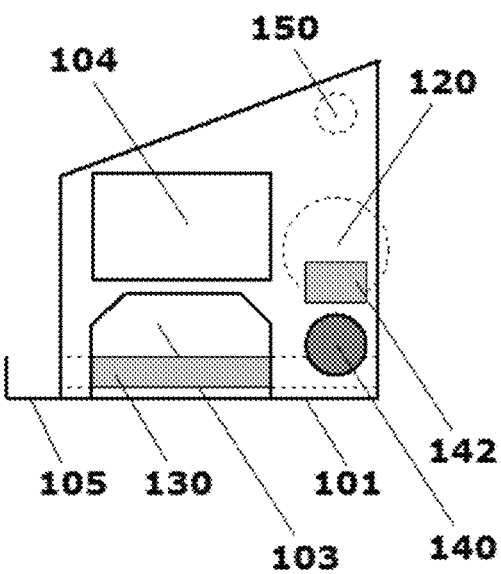
FIG. 1C illustrates a schematic diagram of a second (right) lateral side of the first exemplary embodiment of an aggregate material dispensing device according to this disclosure.

FIGS. 1A-1C provide illustrative external views of a first exemplary embodiment of an aggregate material dispensing device 100 according to this disclosure. FIG. 1A illustrates a schematic diagram of a perspective view of the first exemplary embodiment of the aggregate material dispensing device 100. FIG. 1B illustrates a schematic diagram of a first (left) lateral side of the first exemplary embodiment of the aggregate material dispensing device 100. FIG. 1C illustrates a schematic diagram of a second (right) lateral side of the first exemplary embodiment of the aggregate material dispensing device 100. Throughout this disclosure, like numbers will be used to describe like elements in each of the depicted embodiments.

As shown in FIGS. 1A-1C, the first exemplary embodiment of the disclosed aggregate material dispensing device 100 may include an outer body structure 101. The outer body structure 101 may be formed of any structural material that may be usable for farm implements and farm-related machinery. The outer body structure 101 may be, for example, formed of metal (steel, aluminum and the like), or otherwise may be formed of certain composite structural materials, as appropriate. Generally, the outer body structure 101 is intended be mountable to a truck bed in a number of configurations as will be described in greater detail below. The outer body structure 101 is intended to mount and/or otherwise house all of the structural and mechanical components of the exemplary aggregate material dispensing device 100.

The outer body structure 101 of the exemplary aggregate material dispensing device 100 may include a hinge-type support mount 102 that is intended to allow flexibility in the mounting of the exemplary aggregate material dispensing device 100 to the truck bed in a manner that will be described in detail below with regard to such integration.

The outer body structure 101 of the exemplary aggregate material dispensing device 100 may include an aggregate material outlet 103 as an opening at a lower side of an output side of the exemplary aggregate material dispensing device 100. It is through this opening that aggregate material may be ejected from the exemplary aggregate material dispensing device 100 to waiting external aggregate output receptacles. For transport and/or safety, and particularly to ensure that residual aggregate material does not inadvertently exit through the aggregate material outlet 103, some manner of outlet door 104, which may be translatable in a vertical direction (as shown), or separately translatable in a horizontal direction, or otherwise removable altogether, may be provided. The outlet door 104 may be used to cover the aggregate material outlet 103 when the exemplary aggregate material dispensing device 100 is not "in use."

The outer body structure 101 of the exemplary aggregate material dispensing device 100 may include one or more external shelves or troughs 105. As shown in FIG. 1A, the external trough 105 may span an entire lateral length of the exemplary aggregate material dispensing device 100. Otherwise, one or more of these external troughs 105 may be discreetly mounted at different positions on the exemplary aggregate material dispensing device 100 to provide an accommodation for holding any manner of implements which may be attached to the outside of the outer body structure 101 of the exemplary aggregate material dispensing device 100 for transport to a delivery site. Common examples of such an implement that may be accommodated by one or more of the external troughs 105 are wheelbarrows, rakes, shovels and other like implements for facilitating handling of the dispensed aggregate material at a delivery site.

Because the exemplary aggregate material dispensing device 100 is intended to be mounted on a back of a truck body, accommodation may be made on the outer body structure 101 of the aggregate material dispensing device 100 for appropriate signage or required vehicle signaling devices including lights 106. These lights 106 may be activated through electrical connection to the vehicle signaling systems as appropriate.

The outer body structure 101 of the exemplary aggregate material dispensing device 100 may include an aggregate material opening 110 in a backside (truck bed facing side) of the outer body structure 101. As will be described in greater detail below, it is through this aggregate material opening 110 that aggregate material may be mechanically moved from the truck bed into the exemplary aggregate material dispensing device for further transport to the aggregate material opening 103 to be ejected into waiting external receptacles. The mechanical movement of the aggregate material from the truck bed via the aggregate material opening 110 may be facilitated by a rotating material movement device 120, which may partially protrude from the backside of the outer body structure 101 of the exemplary aggregate material dispensing device 100. The outer body structure 101 of the exemplary aggregate material dispensing device 100 may be adapted for mounting the rotating material movement device 120. Specific configurations of a construction of the rotating material movement device 120, particularly in a form of one or more of a paddle-type device, rake-type or auger-type device that may facilitate movement of the aggregate material to, and through, the aggregate material opening 110, as well as its structural integration into the exemplary aggregate material dispensing device 100, and its operational employment, will be further detail below.

The outer body structure 101 of the exemplary aggregate material dispensing device 100 may be adapted for mounting a material cover roller or take-up device 150. Employment of the material cover roller or take-up device 150 will be otherwise illustrated in additional figures below. The material cover roller or take-up device 150, as depicted, may be used to roll up a material cover, when not in use, for storage and transport. The accommodation of such the material cover on the integral material cover roller or take-off device 150 provides a capacity for the exemplary aggregate material dispensing device 100 to be mounted on, or removed from, a truck bed as an integral mechanical unit. In embodiments, and particularly depending on a mass of the material cover roller or take-up device 150, instead of being mounted toward a top of the outer body structure 101 in the manner depicted, the material cover roller or take-up device 150 may be mounted in an internal volume of the outer body structure 101 below the rotating movement device 120.

The outer body structure 101 of the exemplary aggregate material dispensing device 100 may be adapted for mounting a lateral material movement device 130, which may be in the form of a conveyor, by which aggregate material translated from the truck bed through the aggregate material opening 110 by the powered auger-type device 120 may be then transported in a lateral direction in the exemplary aggregate material dispensing device 100 to, and through, the aggregate material outlet 103.

The outer body structure 101 of the exemplary aggregate material dispensing device 100 may provide a structure for mounting one or more motors 140 by which all automated mechanical transport operations of aggregate material to, and through, the exemplary aggregate material dispensing device 100 may be effected. Each of the one or more motors 140 may be powered by an electrical connection to the electrical power supply systems of the truck on which the exemplary aggregate material dispensing device 100 is mounted for use. Otherwise, the one or more motors 140 may be powered by an external power source, which may be in the form of a battery pack, portable generator, or virtually any other source by which to supply electrical power to the motor 140. The outer body structure 101 of the exemplary aggregate material dispensing device 100 may also provide a structure for mounting a control panel 142 by which operation of the motor 140, and all of mechanical components powered by the one or more motors 140, may be controlled in use. The control panel 142 may include, for example, one button control to activate each of the one or more motors 140. In embodiments, the control panel 142 may include, for example, a joystick by which individual ones of the mechanical components, and motors associated therewith, may be separately or collectively controlled.

Figure 2:
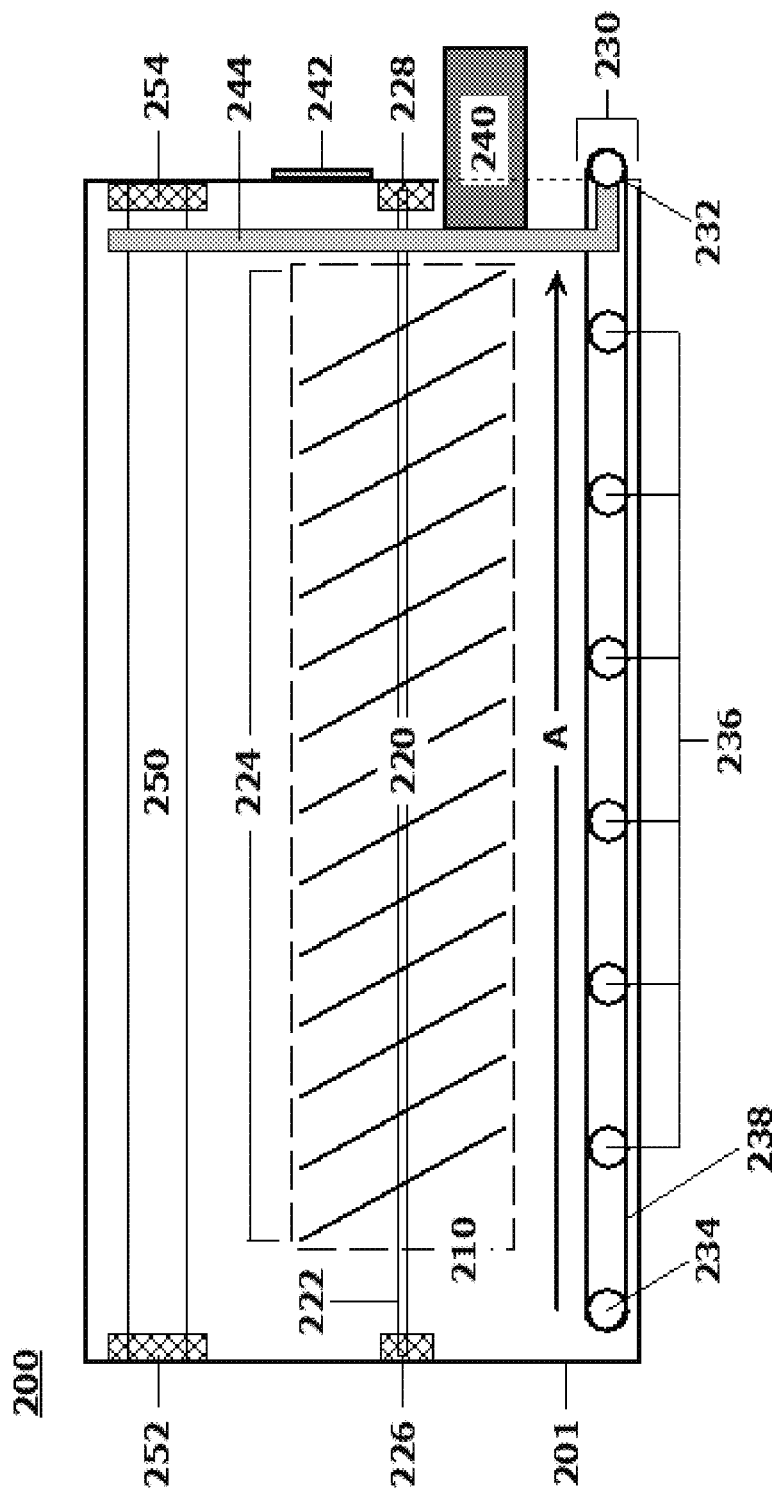
FIG. 2 illustrates a schematic diagram of detail of electro-mechanical (or electro-hydraulic) components associated with a second exemplary embodiment of an aggregate material dispensing device according to this disclosure.

FIG. 2 illustrates a schematic diagram of detail of electro-mechanical (or electro-hydraulic) components associated with a second exemplary embodiment of an aggregate material dispensing device 200 according to this disclosure. In FIG. 2, the outer body structure 201 is shown in a lateral outline form, but is substantially removed in order to facilitate description of the electro-mechanical components mounted in, or on, the outer body structure 201 of the exemplary aggregate material dispensing device 200.

As shown in FIG. 2, a powered rotating material movement device 220 may be provided substantially coincident with an aggregate material opening 210 in a backside (truck-facing side) of the exemplary aggregate material dispensing device 200. As noted briefly above, the powered rotating material movement device 220 may be in a form of a rotating paddle-type device, rotating rake-type device or an auger-type device that may facilitate movement of the aggregate material to, and through, the aggregate material opening 210. In embodiments, the auger-type device may be provided with blades that are designed at a specific length and bent at a specific angle arrived at through extensive experimentation to separate and fluff the aggregate material, particularly as that aggregate material may have been compacted in the truck bed through the loading evolution, and further compacted through the vibration induced when the truck is driven from the aggregate material supply site to the aggregate material delivery site. The rotating material movement device 220 may comprise a shaft 222 that is rotatably affixed at each end of the device to mounting components 226, 228 mechanically affixed to an inner surface of the outer body structure 201 to provide rigid mechanical support for the rotating material movement device 220, while not impeding the rotation of the rotating material movement device 220 with respect to the outer body structure 201.

Rotation of the rotating material movement device 220 may be under control of a motor 240, with mechanical output power from the motor 240 being translated to the rotating shaft 222 of the rotating material movement device 220 via mechanical connection between the motor 240 and the rotating shaft 222 according to a motor mechanical drive system 244, and controlled by a control panel 242. The motor mechanical drive system 244 may be one or more of a belt-drive, gear-drive, hydraulic actuator-drive or other like mechanical driving component system or structure. In other words, no particular limitation to the components by which output power from the motor 240 may be imparted to the rotation of the rotating shaft 222 of the rotating material movement device 220 is implied. In embodiments, rotation of the rotating material movement device 220 may be under the control of a dedicated motor that is provided to drive only the rotating material movement device 220 in the exemplary aggregate material dispensing device 200.

The rotating shaft 222 of the rotating material movement device 220 may have mounted to it a series of auger, rake or paddle-type components 224 that may be usable to pick up, move, separate, pulverized, fluff and/or pitch the aggregate material passing through the aggregate material opening 210 to the internal volume of the exemplary aggregate material dispensing device system to be deposited on a lateral movement device 230, which may be in the form of a conveyor component.

The lateral material movement device 230, when configured as a conveyor component, may be provided in the form of a typical conveyor belt configuration. A conveyor belt 238 may be provided to circulate about a pair of rotating elements 232,334, one or more of which may be powered by the motor mechanical drive system 244 to cause the conveyor belt to move material substantially in direction A. The motor mechanical drive system 244 may provide the mechanical attachment between the motor 240 and the one or more of the pair of rotating elements 232,234 to power the movement of the lateral material movement device 230 for the movement of the aggregate material deposited thereon by the rotating material movement device 220 in the direction A. In embodiments, a dedicated motor may be provided in direct mechanical attachment to the one or more of the pair of rotating elements 232, 234 to power the movement of the lateral material movement device 230. A series of intermediary rollers 236 may also be provided to support the conveyor belt 238 in its routine movement of the aggregate material in direction A, as shown. Those of skill in the art will recognize that, although depicted in this exemplary aggregate material movement device 200 as a conveyor component, the lateral material movement device 230 may take on configurations of other known transport component mechanisms as substitutes for the depicted conveyor component configuration shown in, for example, FIG. 2. For example, the lateral material movement device 230 may be configured in a form of an auger-type set of lateral movement components in place of the depicted conveyor component. In other words, no particular configuration to the lateral material movement device 230 is intended to be implied by the specific depiction in FIG. 2.

The exemplary aggregate material dispensing device 200 may include a material cover roller or take-up device 250, which may be in a form of a shaft or roller that is rotatably affixed at each end of the device to mounting components 252, 254 mechanically affixed to an inner surface of the outer body structure 201 to provide rigid mechanical support for the material cover roller or take-up device 250, while not impeding the rotation of the material cover roller or take-up device 250 with respect to the outer body structure 201. As indicated above, in embodiments, and particularly depending on a mass of the material cover roller or take-up device 250, instead of being mounted toward a top of the outer body structure 201 in the manner depicted, the material cover roller or take-up device 250 may be mounted in an internal volume of the outer body structure 201 below the rotating movement device 220.

Rotation of the material cover roller or take-up device 250 may also be under control of the motor 240. Mechanical output power from the motor 240 may be translated to the material cover roller or take-up device 250 via a same or separate mechanical connection between the motor 240 and the device according to the motor mechanical drive system 244, and controlled by the control panel 242. The motor mechanical drive system 244 may be one or more of the configurations described above with respect to the connection of the motor mechanical drive system 244 to the rotating shaft 222 of the rotating material movement device 220. Again here, no particular limitation to the components by which output power from the motor 240 may be imparted to the rotation of the material cover roller or take-up device 250 is implied. In embodiments, rotation of the material cover roller or take-up device 250 may be under the control of a dedicated motor that is provided to drive only the material cover roller or take-up device 250 in the exemplary aggregate material dispensing device 200.

Figure 3:
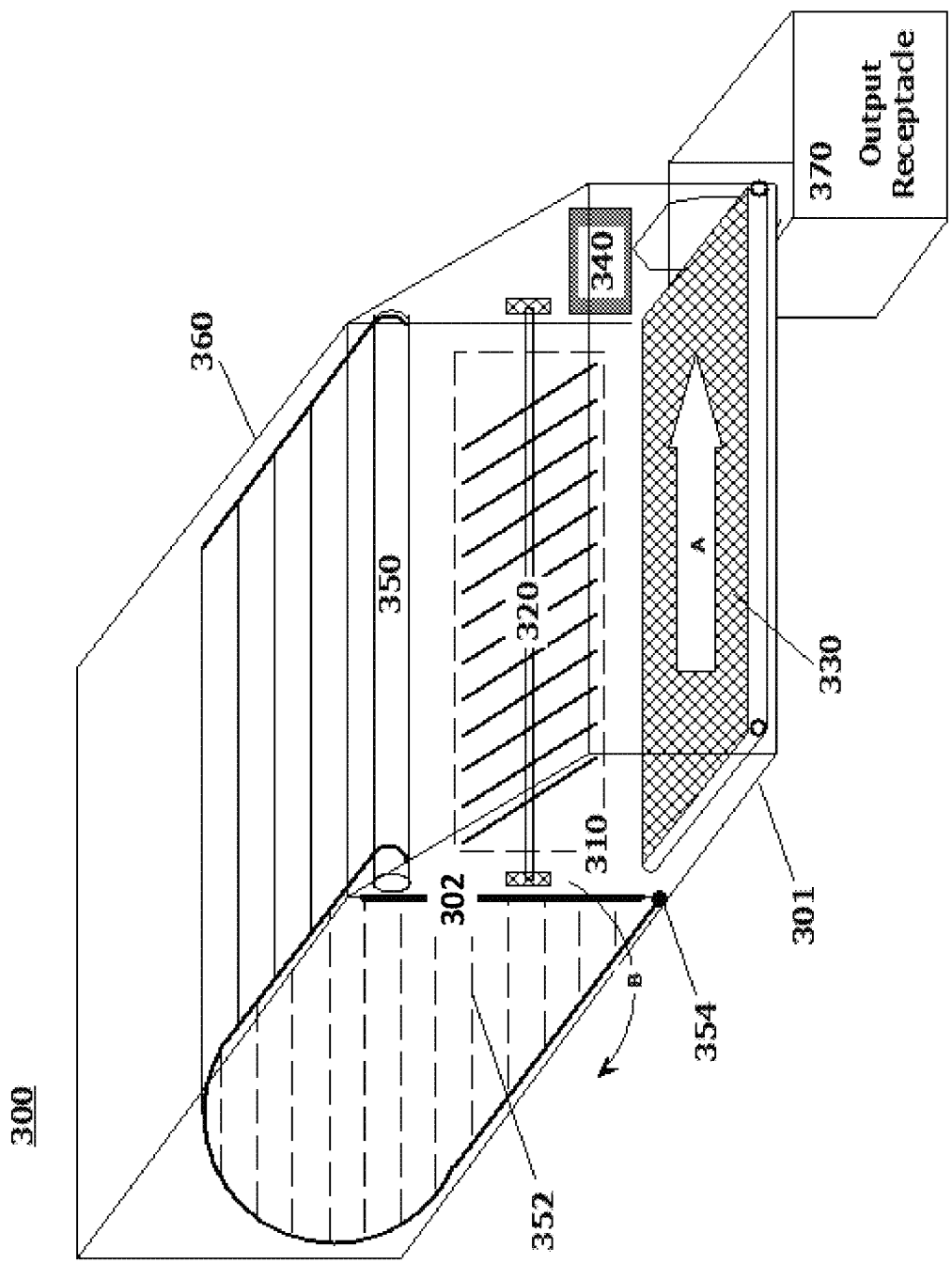
FIG. 3 illustrates a schematic diagram of a perspective view of a third exemplary embodiment of an aggregate material dispensing device according to this disclosure mounted on a truck bed for use.

FIG. 3 illustrates a schematic diagram of a perspective view of a third exemplary embodiment of an aggregate material dispensing device 300 according to this disclosure mounted on a truck bed 360 for use. Certain of the detail included in the exemplary embodiments depicted in FIGS. 1A-1C and 2, is omitted for clarity and ease of depiction. Such omissions are not intended to imply that any combination of the disclosed features may not be incorporated into any one of the depicted exemplary embodiments.

As shown in FIG. 3, the exemplary aggregate material dispensing device 300 may be mounted on the truck bed 360 by being simply mechanically hung according to integral hooks (not shown) which are provided to simply allow the outer body structure 301 of the exemplary aggregate material dispensing device 300 to engage an upper rear edge of the truck bed 360. In embodiments, the exemplary aggregate material dispensing device 300 may be otherwise mounted on the truck bed 360 via an integrated hinge component 302. When mounted using such an integrated hinge component 302, the structure of the aggregate material dispensing device 300 may be rotatable in direction B with respect to the truck bed 360 in order to provide, for example, a capacity to load retrograde debris into the truck bed for removal from the delivery site and later disposal at, for example, a disposal facility.

As shown in FIG. 3, an output receptacle 370 for receiving aggregate material ejected through the opening in the outer body structure 301 of the exemplary aggregate material dispensing device 300 may be provided. The output receptacle 370 may typically be in a form of a wheelbarrow or other wheeled cart for moving the dispensed aggregate material from the truck on which the exemplary aggregate material dispensing device 300 is positioned to areas at the delivery site that are substantially inaccessible by the truck.

FIG. 3 provides additional details with regard to the material cover 352 associated with the motor-powered material cover roller or take-up device 350. The material cover 352 may be provided as an integral or an attachable component of the exemplary aggregate material dispensing device 300. For example, attach points 354 may be provided at corners of the exemplary aggregate material dispensing device 300, or may be provided at intervals substantially all along a lower portion of a backside (truck-facing side) of the exemplary aggregate material dispensing device 300, to fixedly or detachably attach a first and of the material cover 352. In embodiments, the material cover roller or take-up device 350 is mounted below the rotating movement device 320, the attach points may be provided at upper corners of the exemplary aggregate material dispensing device 300, or may be provided intervals substantially along an upper portion of the backside (truck-facing side of the exemplary aggregate material dispensing device 300. The material cover 352 may be in a form of a tarpaulin, canvas, nylon, polymer or other composite material sheet, which may be provided to substantially "line" the truck bed in a manner as depicted in FIG. 3, or otherwise, to facilitate material covering and handling of the aggregate material loaded in the truck bed as will be described in somewhat greater detail below.

A second end of the material cover 352, opposite the first end attached to the attach points 354, may be fixedly or detachably attached to the material cover roller or take-up device 350. Prior to commencement of a loading operation at an aggregate material supply site, the material cover 352, attached at the attach points 354, or the material cover roller or take-up device 350, when it is mounted toward a bottom of the exemplary aggregate material dispensing device 300, may be laid out in the truck bed 360. The other end of the material cover 352 may be detached from the attach points 354 or the material cover roller or take-up device 350 (depending on a configuration of the material cover roller or take-up device 350) and that portion of the material cover 352 not positioned in the truck bed 360 may be laid over the cab of the truck, for example. At this point, the aggregate material may be loaded into the truck bed 360 substantially covering that portion of the material cover 352 which lines at least the bottom of the truck bed 360. Once the truck bed 360 is full of the aggregate material, the free end of the material cover 352 may be pulled over the loaded aggregate material, and attached to the one of the attach points 354 and the material cover roller or take-up device 350 that is toward a top of the exemplary aggregate material dispensing device 300 so as to substantially cover the aggregate material load for transport from the supply site to the delivery site.

Once at the delivery site, with the output receptacle 370 positioned to receive aggregate material ejected from the exemplary aggregate material dispensing device 300, the motor 340 may be activated via the attendant control panel. Operation of the motor may cause coincident rotation of the material cover roller or take-up device 350 and the rotating material movement device 320. In this manner, the material cover 352 is pulled by the rotation of the material cover roller or take-up device 350 in a manner that causes the material cover 352 to urge the loaded aggregate material toward the aggregate material opening 310 in the exemplary aggregate material dispensing device 300, and the coincident rotating material movement device 320. Here, the rotational operation of the rotating material movement device 320 causes the aggregate material urged toward it to be broken up or otherwise fluffed and translated to the lateral material movement device 330 to then be transported in direction A toward the opening outer body structure 301 of the exemplary aggregate material dispensing device 300 and deposited in the output receptacle 370 for use. In embodiments, particularly in embodiments in which separate motors are used to control separate ones of the mechanical devices, retraction of the material cover 352, to thereby urge the aggregate material in the truck bed 360 toward the aggregate material opening 310 in the exemplary aggregate material dispensing device 300 may be separately controlled to provide for movement of the aggregate material in the truck bed 360 prior to engaging the rotating material movement device 320.

Figure 4:
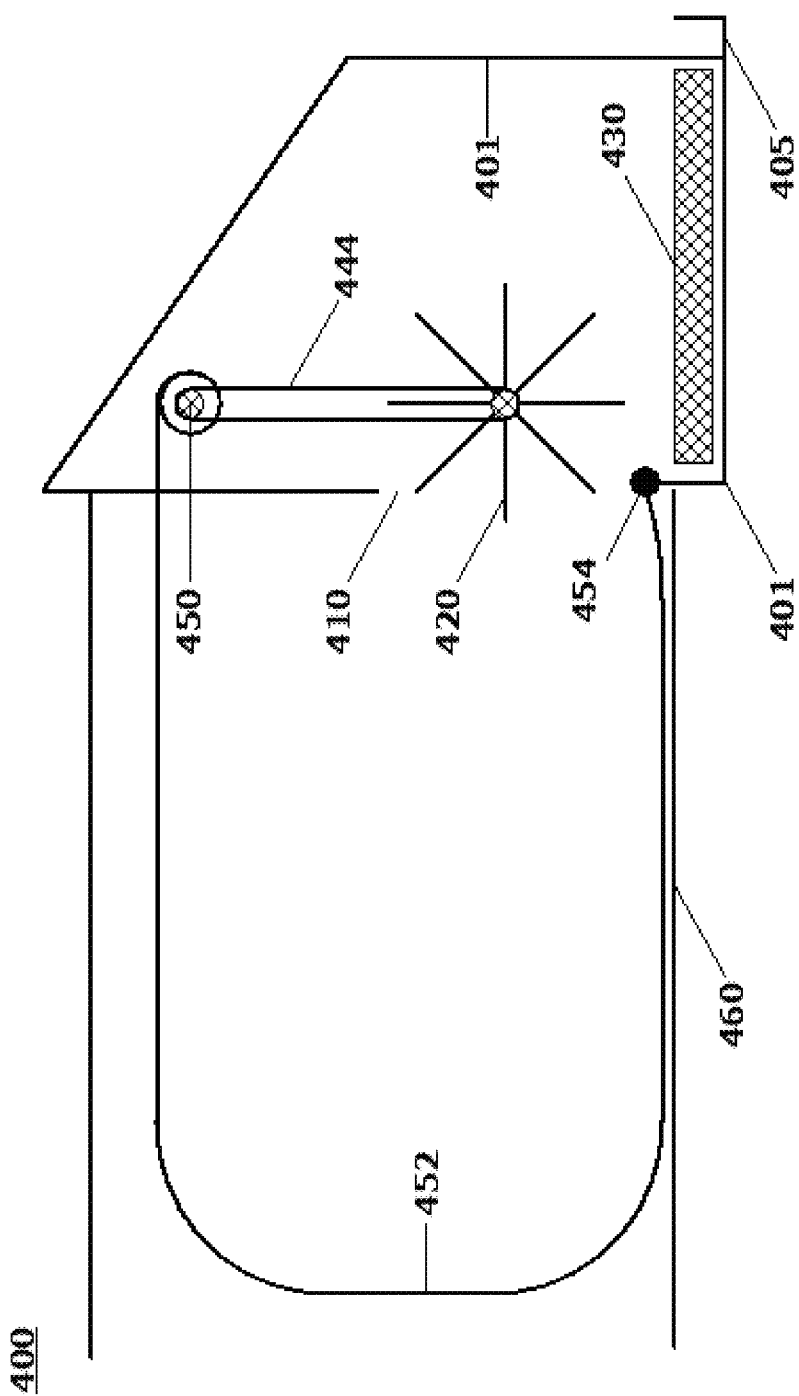
FIG. 4 illustrates a schematic diagram of a side view of a fourth exemplary embodiment of an aggregate material dispensing device according to this disclosure mounted on a truck bed for use.

FIG. 4 illustrates a schematic diagram of a side view of a fourth exemplary embodiment of an aggregate material dispensing device 400 according to this disclosure mounted on a truck bed 460 for use. Again here, certain of the detail included in the exemplary embodiments depicted in FIGS. 1A-1C, 2 and 3, is omitted for clarity and ease of depiction. Such omissions are not intended to imply that any combination of the disclosed features may not be incorporated into any one of the depicted exemplary embodiments.

FIG. 4 provides a different perspective on certain of the additional details with regard to the material cover 452 associated with the motor-powered material cover roller or take-up device 450. As described above, the material cover 452 may be provided as an integral or an attachable component of the exemplary aggregate material dispensing device 400. For example, attach points 454 may, in like manner, be provided at corners of the exemplary aggregate material dispensing device 400, or may be provided at intervals substantially all along either of a lower or an upper portion of a backside (truck-facing side) of the exemplary aggregate material dispensing device 400, opposite the positioning of the motor-powered material cover roller or take-up device 450 in the manner described above. The material cover 452 may be in a same form as that described above with respect to FIG. 3.

One end of the material cover 452, opposite the end attached to the attach points 454, is shown attached to the material cover roller or take-up device 450 in a configuration that it would be after the aggregate material loading evolution into the truck bed 460 at the aggregate material supply site to substantially cover the aggregate material loaded in the truck bed 460 for transport from the supply site to the delivery site.

Once at the delivery site, an output receptacle, which may have been carried to the delivery site by being positioned in, or associated with, the external shelf or trough 405, may be positioned in the manner described above with respect to the outer body structure 401 of the exemplary aggregate material dispensing device 400 to receive aggregate material ejected from the exemplary aggregate material dispensing device 400. The motor (or motors) may be activated via the attendant control panel to cause coincident rotation of the material cover roller or take-up device 450 and the rotating material movement device 420 as motor output power is translated to individual shafts of the rotating material movement device 420 and the material cover roller or take-up device 450 via the motor mechanical drive system 444. In this manner, the material cover 452 is pulled by the rotation of the material cover roller or take-up device 450 (to the right in the depiction in FIG. 4) in a manner that causes the aggregate material covered by the material cover 452 to be urged toward the aggregate material opening 410 in the exemplary aggregate material dispensing device 400, and the coincident rotating material movement device 420. Here, the rotational operation of the rotating material movement device 420 causes the aggregate material urged toward it to be broken up or otherwise fluffed and translated to the lateral material movement device 430 to then be transported toward the opening in the outer body structure 401 of the exemplary aggregate material dispensing device 400 and deposited in the waiting output receptacle for use.

In operation, implementations of the exemplary aggregate material dispensing devices described above with respect to any one or more of FIGS. 1-4 may simplify aggregate material delivery to particular locations to which, for example, a truck carrying the aggregate material does not have direct access at the delivery site. Implementation of the disclosed systems may provide, for example, single button operation of the powered electro-mechanical (or electro-hydraulic) components to deliver aggregate material to output receptacles, generally in the form of wheeled receptacles, including wheelbarrows, for further delivery of the aggregate material to the particular locations at the delivery site. Implementation of the disclosed schemes will render more efficient the aggregate delivery operations and eliminate the need for additional personnel, for example, to be available to facilitate these more efficient aggregate delivery operations. A further advantage is that user fatigue from, and the physical strain on the user body incumbent in, the manual shoveling of the aggregate material from the truck bed to the receptacles is substantially limited.

Figure 5:
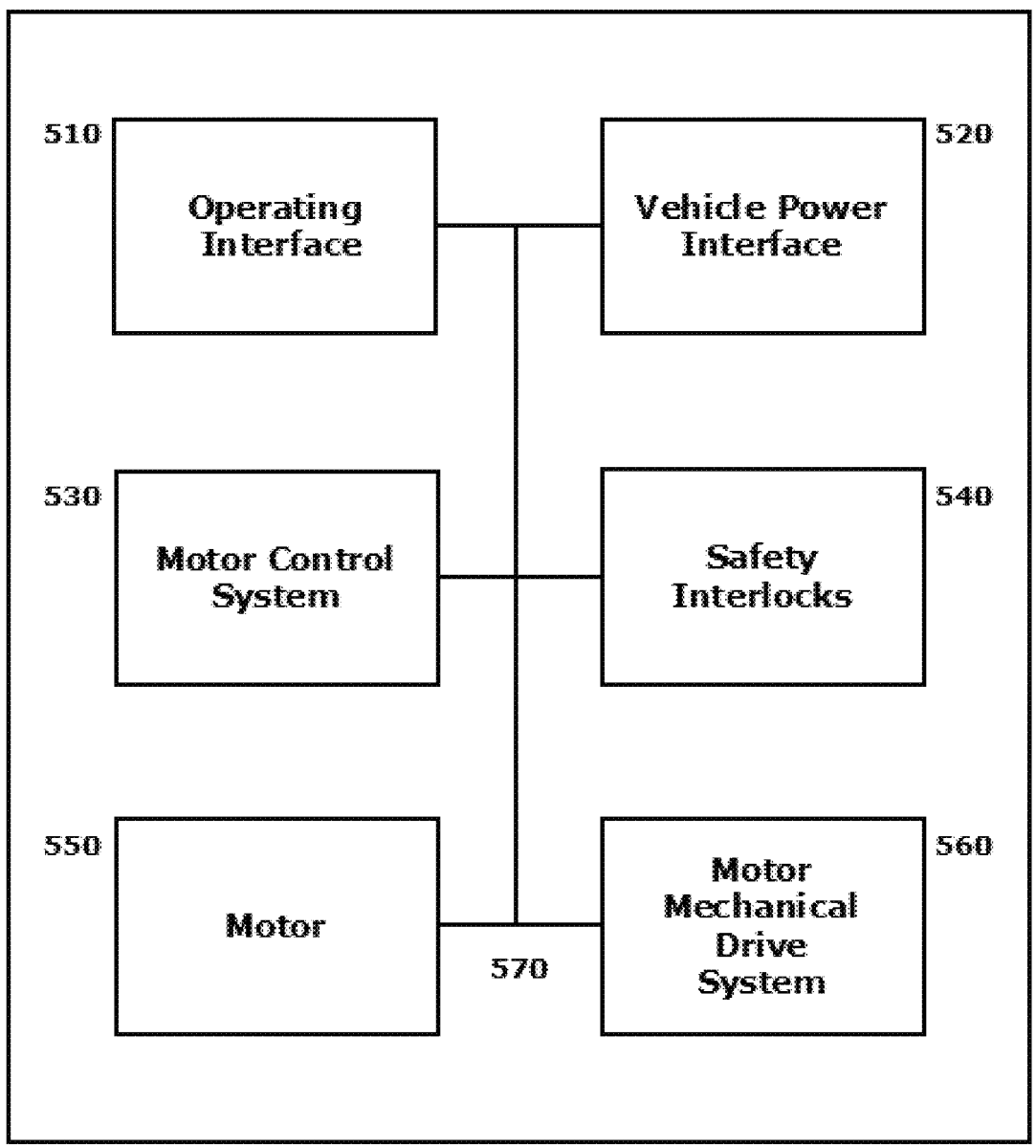
FIG. 5 illustrates a block diagram of an exemplary control system for controlling an aggregate material dispensing device according to this disclosure.

FIG. 5 illustrates a block diagram of an exemplary control system 500 for controlling an aggregate material dispensing device according to this disclosure. Components of the exemplary control system 500 may be integrated into a control panel, which may be positioned in a vicinity of an aggregate material outlet opening and an outer body structure of the exemplary aggregate material dispensing device in the manner shown, for example, in either of FIG. 1C or 2, or otherwise on the outer body structure of the exemplary aggregate material dispensing device in any position that is considered particularly usable for operation of the aggregate material dispensing device substantially in the manner disclosed above.

The exemplary control system 500 may include an operating interface 510. The operating interface 510 may provide one or more of a visual or audible indication that electrical power is provided to the exemplary aggregate material dispensing device for example through a vehicle power interface 520, or otherwise. When a vehicle power interface 520 is employed, such vehicle power interface 520 may be configured to provide for an electrical connection between the exemplary aggregate material dispensing device and the electrical power system of the truck on which the exemplary aggregate material dispensing device is provided for use. The operating interface 510 may incorporate, or otherwise may be in communication with, a motor control system 530, which may be in a form of a one-button switch, a joystick or the like for operation of the motor (or motors) 550 to provide coordinated or separate electro-motive power to one or more of the moving mechanical components in the exemplary aggregate material dispensing device according to the details provided above, including via a motor mechanical drive system 560. A series of safety interlocks 540 may be provided in order that mechanical movement of any of the mechanical components in the exemplary aggregate material dispensing device may be stopped when one or more unsafe and/or hazardous conditions is detected according to parameters of those safety interlocks, and/or sensors associated therewith. Each of the individually depicted components of the exemplary control system 500 may have associated with it some manner of visual, aural, or haptic feedback to a user of normal and/or abnormal operating conditions of any of the mechanical components associated with the exemplary aggregate material dispensing device. Power and/or information data feedback communications may be provided between each of the individually-depicted components of the exemplary control system 500 via one or more power/data/control busses 570.

Figure 6:
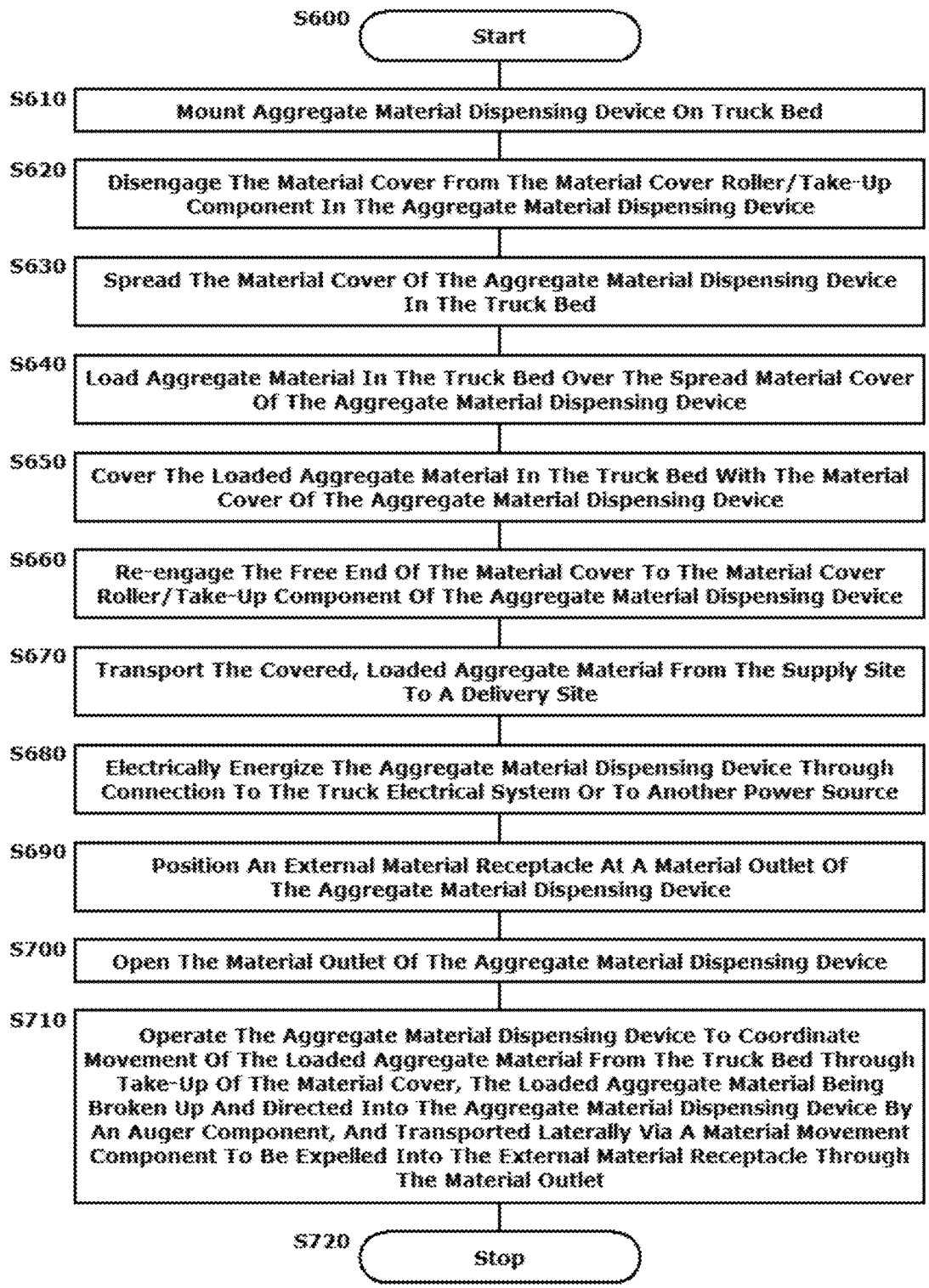
FIG. 6 illustrates a flowchart of an exemplary method for facilitating an aggregate material dispensing evolution employing an aggregate material dispensing device according to this disclosure.

FIG. 6 illustrates a flowchart of an exemplary method for facilitating an aggregate material dispensing evolution employing an aggregate material dispensing device according to this disclosure. As shown in FIG. 6, operation of the method commences at Step S600 and proceeds to Step S610.

In Step S610, an aggregate material dispensing device may be mounted on a truck bed. As described above, the mounting methods for the aggregate material dispensing device are not particularly limited. These mounting methods may include any mechanical attachment by which such devices may normally be removably attached to truck beds including by using enteral hanger components, which may be in a form of hooks, or by using an integrated hinge device such as that described in some detail above. Operation of the method proceeds to Step S620.

In Step S620, an end of a material cover may be disengaged from a material cover roller/take-up component in (or from fixed external mounting points on an outer body structure of) the aggregate material dispensing device. Operation of the method proceeds to Step S630.

In Step S630, at least a portion of the material cover, which may be fixedly attached to whichever of the fixed external mounting points on the outer body structure or the material cover roller/take-a component is located at a lower end of the truck bed facing side of the aggregate material dispensing device, may be spread in a bottom of the truck bed. Additional material of the material cover may be laid over, for example, the truck cab for later use. Operation of the method proceeds to Step S640.

In Step S640, aggregate material may be loaded in the truck bed over the spread material cover of the aggregate material dispensing device according to known methods. Operation of the method proceeds to Step S650.

In Step S650, a free end of the material cover may be arranged so as to cover the loaded aggregate material in the truck bed. Operation of the method proceeds to Step S660.

In Step S660, the free end of the material cover may be re-engaged with the fixed attach points or the material cover roller/take-up component of the aggregate material dispensing device in a manner that keeps the aggregate material loaded in the truck bed covered for transport. Operation of the method proceeds to Step S670.

In Step S670, the covered, loaded aggregate material may be transported via the truck from the supply site to a delivery site. Operation of the method proceeds to Step S680.

In Step S680, once at the delivery site, the aggregate material dispensing device may be electrically energized through connection to the truck electrical system or to any other external power source via a compatible electrical power interface. Operation of the method proceeds to Step S690.

In Step S690, an external material receptacle may be positioned at a material outlet of the aggregate material dispensing device. Operation of the method proceeds to Step S700.

In Step S700, if covered, the material outlet of the aggregate material dispensing device may be opened. Operation of the method proceeds to Step S710.

In Step S710, through a one-button operation, a joystick operation or otherwise, the aggregate material dispensing device may be operated in a manner to coordinate movement of the loaded aggregate material from the truck bed through take-up of the material cover as it is recovered by the material cover roller/take-up component. This movement causes the loaded aggregate material to be urged toward an opening in the outer body structure of the aggregate material dispensing device where it may be broken up and directed into the aggregate material dispensing device by an auger-type (rake-type or other) rotating component. Once inside the aggregate material dispensing device according to this movement scheme, the broken up aggregate material may then be translated laterally via a material movement component to be expelled into the positioned external material receptacle through the material outlet in the outer body structure of the aggregate material dispensing device. One or more motors may be provided to individually or collectively control the movement of each of the mechanical components involved in the aggregate material movement scheme through the aggregate material dispensing device. Operation of the method proceeds to Step S720, where operation of the method ceases.

The disclosed exemplary aggregate material dispensing device is simple in it is construction and operation. As such, it is capable of being economically manufactured, and sold to a broad spectrum of small entity aggregate delivery companies that may benefit from the full implementation of the disclosed schemes.

The disclosed schemes are intended to address and/or overcome shortfalls in the related art in which any arguably similar product, often employed for heavy construction use, may be too expensive for a typical small aggregate delivery company to implement for daily use. In this regard, the disclosed schemes represent a particular improvement upon currently-available bulk aggregate delivery systems. Using a simple, straight-forward truck powered single switch operation of an automated system for moving aggregate from the truck bed to waiting receptacles may provide significant improvements over all currently available systems and methods, which may be considered in some way similar to the disclosed schemes. Further, the above-described and other benefits may inure in other operational employments and operational scenarios for the disclosed systems and methods well outside the movement of mulch in a landscaping operation. The potential cost savings in measurable and immeasurable efficiencies are boundless.

Specific reference to, for example, the above-discussed embodiments for the disclosed powered systems, devices, schemes, methods, processes and/or techniques for aggregate material delivery, and characteristics of the exemplary embodiments specifically directed to use in a mulch delivery scheme undertaken by a landscaping company, should not be interpreted to constrain the disclosed systems, devices, schemes methods, processes and/or techniques, or any products or product components, to only those embodiments. The depicted and described embodiments are included for non-limiting illustration of the disclosed concepts for implementing these systems, devices, schemes methods, processes and/or techniques for more efficient aggregate delivery that include, but are not limited to, use of the depicted conveyor-type transport component, as shown. All of the above depictions and/or descriptions should, therefore, be interpreted as being exemplary only, and not limiting the disclosed schemes, in any manner.

Features and advantages of the disclosed embodiments are set forth in this disclosure and may be, at least in part, obvious from this detailed description, or may be learned by practice of the disclosed embodiments. The features and advantages of the disclosed embodiments may be realized and obtained by means of the instruments and combinations of features particularly described.

The above-described exemplary systems and methods reference certain conventional components and real-world use cases to provide a brief, general description of suitable systems and system operations by which the subject matter of this disclosure may be implemented for familiarity and ease of understanding.

Those skilled in the art will appreciate that other embodiments of the disclosed subject matter may be practiced in many disparate forms and devices of many different configurations.

The exemplary depicted sequence of method steps represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 6, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A material delivery system configured as an integral unit for mounting on an open end of a bulk material supply source, comprising:
   a first material movement device that is configured to be mechanically operated to move material out of the bulk material supply source in a first material flow direction;
   a second material movement device that is configured to be mechanically operated to move the material toward an outlet in a second material flow direction, the second material flow direction being substantially orthogonal to the first material flow direction;
   a third material movement device that is configured to urge movement of the material in the bulk material supply source toward the first material movement device; and
   at least one motor configured to induce mechanical movement in at least one of the first material movement device and the second material movement device to move the material from the bulk material supply source toward the outlet,
   the third material movement device comprising:
      a roller component with a rotating axis substantially spanning a length of the material delivery system in the second material flow direction, and
      a flexible material cover component having (1) a first end configured to be attached to a structure of the material delivery system in a vicinity of the second material movement device, and (2) a second end opposite the first end configured to be attached to the roller component.

2. The material delivery system of claim 1, the flexible material cover component being further configured to be (1) extendible away from the material delivery system into the bulk material supply source to substantially cover a bottom of the bulk material supply source, and (2) extendible over the material in the bulk material supply source after the bulk material supply source is loaded.

3. The material delivery system of claim 1, the roller component being configured to retract the flexible material cover component to urge the movement of the material in the bulk material supply source toward the first material movement device.

4. The material delivery system of claim 3, a rotating motion of the roller component for retraction of the flexible material cover component being induced via a mechanical connection between the roller component and the at least one motor.

5. The material delivery system of claim 1, the bulk material supply source being a truck bed of a truck, the material delivery system further comprising at least one attachment element for mechanically attaching the material delivery system to a body structure of the truck.

6. The material delivery system of claim 5, the at least one attachment element comprising a hinge component configured to allow the material delivery system to be repositioned with respect to the body structure of the truck while the material delivery system remains attached to the body structure of the truck.

7. The material delivery system of claim 5, the at least one motor comprising an electrical connection for providing electrical power to the at least one motor, the electrical connection being adapted for connecting to an electrical system of the truck.

8. The material delivery system of claim 1, the first material movement device comprising a rotatable structure with a rotating axis horizontally spanning a length of the second material movement device in the second material flow direction.

9. The material delivery system of claim 8, the rotatable structure comprising:
   an axle mounted at each end to a structure of the material delivery system; and
   a plurality of blades extending outward from the axle.

10. The material delivery system of claim 8, a rotating motion of the rotatable structure being induced via a mechanical connection between the rotatable structure and the at least one motor.

11. The material delivery system of claim 1, the second material movement device comprising a conveyor material movement unit.

12. The material delivery system of claim 11, a motion of the conveyor material movement unit for moving the material toward the outlet in the second material flow direction being induced via a mechanical connection between the conveyor material movement unit and the at least one motor.

13. The material delivery system of claim 1, the at least one motor being structurally mounted to the material delivery system at the outlet.

14. The material delivery system of claim 1, the at least one motor being controlled by a control panel mounted in a vicinity of the outlet.

* * * * *